United States Patent [19]

DePuy

[11] Patent Number: 4,477,856
[45] Date of Patent: Oct. 16, 1984

[54] RELAY SPARE CIRCUIT FOR A RECLOSER RELAY

[75] Inventor: Robert P. DePuy, Cherry Hill, N.J.

[73] Assignee: General Electric Company, King of Prussia, Pa.

[21] Appl. No.: 429,718

[22] Filed: Sep. 30, 1982

[51] Int. Cl.³ .......................... H02H 3/04; H02H 3/06
[52] U.S. Cl. ..................................................... 361/72
[58] Field of Search ..................... 361/71, 72, 73, 74, 361/75

[56] References Cited

U.S. PATENT DOCUMENTS 3,381,177  4/1968  Allen ................................... 361/72
3,878,436  4/1975  Bogel ................................... 361/72

Primary Examiner—Harry E. Moose, Jr.
Attorney, Agent, or Firm—William Freedman

[57] ABSTRACT

A relay spare circuit for a recloser relay provides an output signal selected to occur during a particular segment of the reclose cycle of a fault-responsive circuit breaker. A set of switches is provided to select which of a plurality of available recloses are to be used and where in the resulting reclose cycle the relay spare is to operate, and a logic circuit is provided which compares the selected switches with a counter responsive to advancement of the recloser relay through the reclose cycle, to provide the relay spare output signal at the selected point in the reclose cycle.

15 Claims, 5 Drawing Figures

| RELAY SPARE SELECTION | RELAY SPARE (RS) INPUT SIGNALS | | | |
|---|---|---|---|---|
| | A | B | C | D |
| 1 | 1 | X | X | X |
| 2 | 0 | 1 | X | X |
| 3 | 0 | 0 | 1 | X |
| 4 | 0 | 0 | 0 | 1 |

FIG. 4

| RELAY SPARE (RS) SELECTION | RELAY SPARE INPUT SIGNALS | | | | RECLOSE INPUT SIGNALS | | | |
|---|---|---|---|---|---|---|---|---|
| | A | B | C | D | E | F | G | H |
| 1 | 1 | X | X | X | 0 | X | X | X |
| 2 | X | 1 | X | X | 0 | 0 | X | X |
| 3 | X | X | 1 | X | 0 | 0 | 0 | X |
| 4 | X | X | X | 1 | 0 | 0 | 0 | 0 |

FIG. 5

RELAY SPARE CIRCUIT FOR A RECLOSER RELAY

BACKGROUND OF THE INVENTION

The present invention relates generally to recloser relays, and more particularly, to a relay spare circuit for use with such recloser relays.

Recloser relays are typically provided to control the reclosure of a fault-responsive circuit breaker. Relay spare circuits are typically provided to alter or control the operation of the associated power system during a reclose cycle, or to control when in a reclose cycle certain fault-responsive relays are to operate an associated circuit breaker. For example, relay spare circuits may be used to provide such functions as blocking automatic load-ratio control, blocking the instantaneous trip circuit following a second reclosure, or as a spare contact in reclosure applications such as to provide a spare alarm contact.

The timing of a reclose cycle is generally regulated by a rotating cam shaft which operates in conjunction with associated, mechanically operated switches. Examples of such systems may be found in U.S. Pat. Nos. 3,381,177, issued to W. P. Allen, and 3,333,154 and 2,582,027, issued to L. E. Goff, Jr. In additon to regulating the reclose cycle, such systems may also be used to similarly regulate operation of the relay spare circuit.

However, because the high spot on a cam has a fixed width, the time delay associated with the relay spare circuit is limited to a function of the rotation of the cam, and accordingly, the overall reclose cycle. Moreover, such cam shaft operated mechanisms do not readily permit the selection of the portion of the reclose cycle at which the relay spare circuit is to be operated. It is therefore desirable to perform the same function electronically, to remove these dependencies and provide a more versitile relay spare circuit. Further, it is desirable to develop such as relay spare output without requiring the use of a plurality of separate switches and timers to do so.

Accordingly, it is a primary object of the present invention to develop a relay spare circuit which is capable of electronically developing a desired relay spare output.

It is a further object of the present invention to develop a relay spare circuit which is capable of electronically developing a desired relay spare output without requiring the use of a multiplicity of switches and timers.

It is a further object of the present invention to provide a relay spare circuit having the ability to select when in the reclose cycle the relay spare output is to occur.

It is a further object of the present invention to provide a relay spare circuit including a series of switches which may be utilized by an operator to select when in the reclose cycle the relay spare output is to occur.

It is a further object of the present invention to provide a relay spare circuit with a priority function which assists in the correction of inadvertent or erroneous setting of the operator selected switches.

SUMMARY OF THE INVENTION

In accordance with the present invention, a relay spare circuit for a recloser relay is provided which is responsive to advancement of the recloser relay through a reclose cycle and which generally comprises:
 (a) a plurality of switches for selecting which of the several available relay reclosures are to be used;
 (b) a plurality of switches for selecting the relay reclosures which are to include a relay spare; and
 (c) logic means for providing a relay spare output signal (RS) in accordance with the relay spare selection and reclose selection switches which have been selected and in accordance with the following equation.

$$RS = \left(E + \cfrac{1}{A + \cfrac{1}{F + \cfrac{1}{B + \cfrac{1}{G + \cfrac{1}{C + \cfrac{1}{H + \cfrac{1}{D}}}}}}}\right) \overline{Q3(A + B + C + D)} \ \overline{A(Q1 + Q2) + BQ2} \ \overline{CQ1Q2} + L$$

Further in accordance with the present invention, the condition of the relay spare selection switches is compared with the condition of the reclose selection switches to assist in preventing inadvertent or erroneous setting of the switches by an operator. For example, if a relay spare is selected to occur in conjunction with an unselected reclose, the relay spare is caused to operate in conjunction with the closest preceeding selected reclose, if possible. If the earliest selected reclose occurs later than the earliest selected relay spare, the relay spare output is caused to remain present until the recloser relay assumes a lockout condition, which inhibits the relay spare output.

The features of the invention which are believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIG. 4 is a matrix describing the selection of relay spares during a reclose cycle;

FIG. 5 is a matrix describing an alternative selection of relay spares during a reclose cycle.

In the several views provided, like reference numerals denote similar signals.

DETAILED DESCRIPTION OF THE PREFERRED EMBODIMENT

Figure 1:
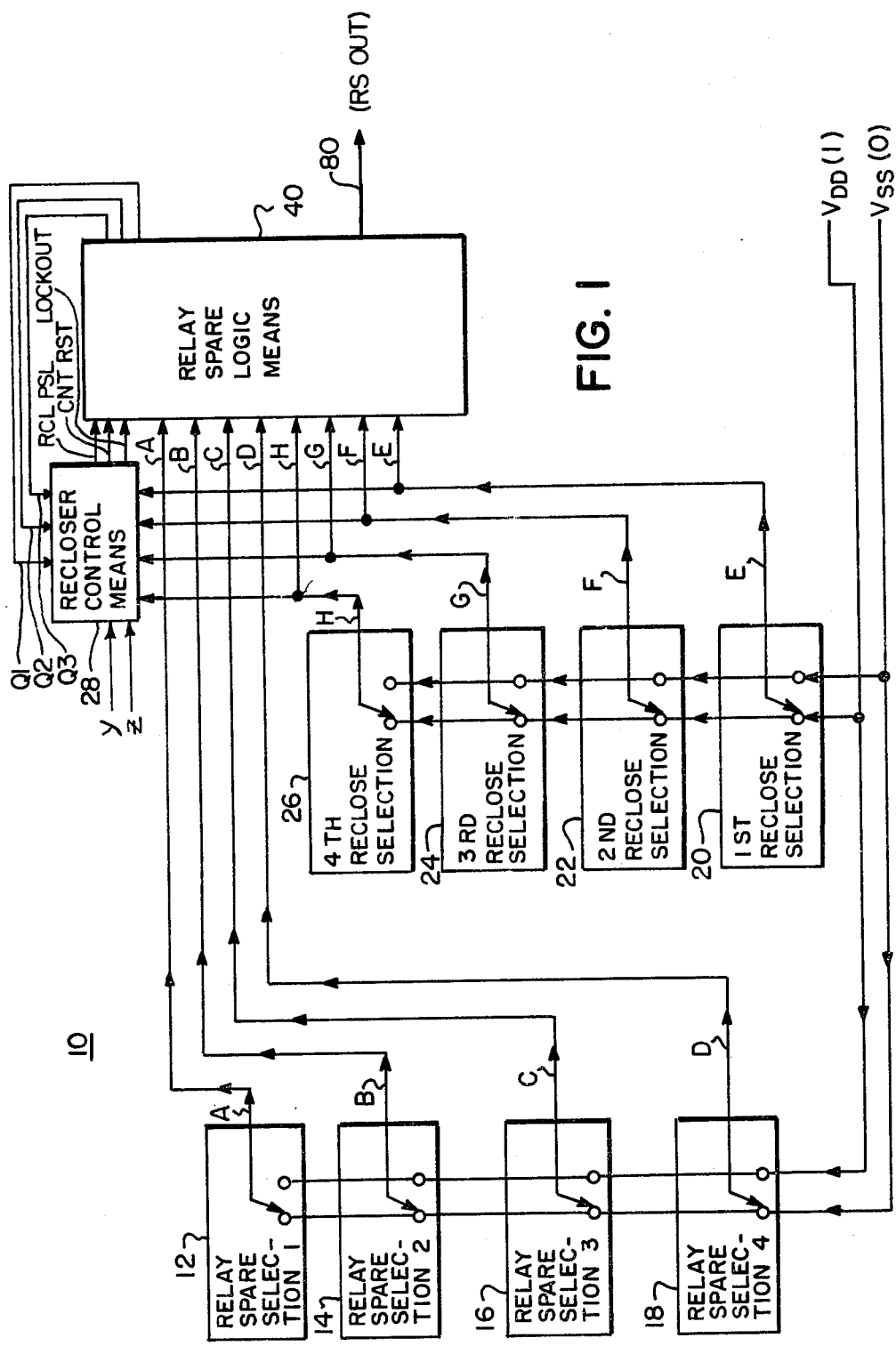
FIG. 1 is a block diagram showing the relay spare circuit of the present invention.
Figure 2:
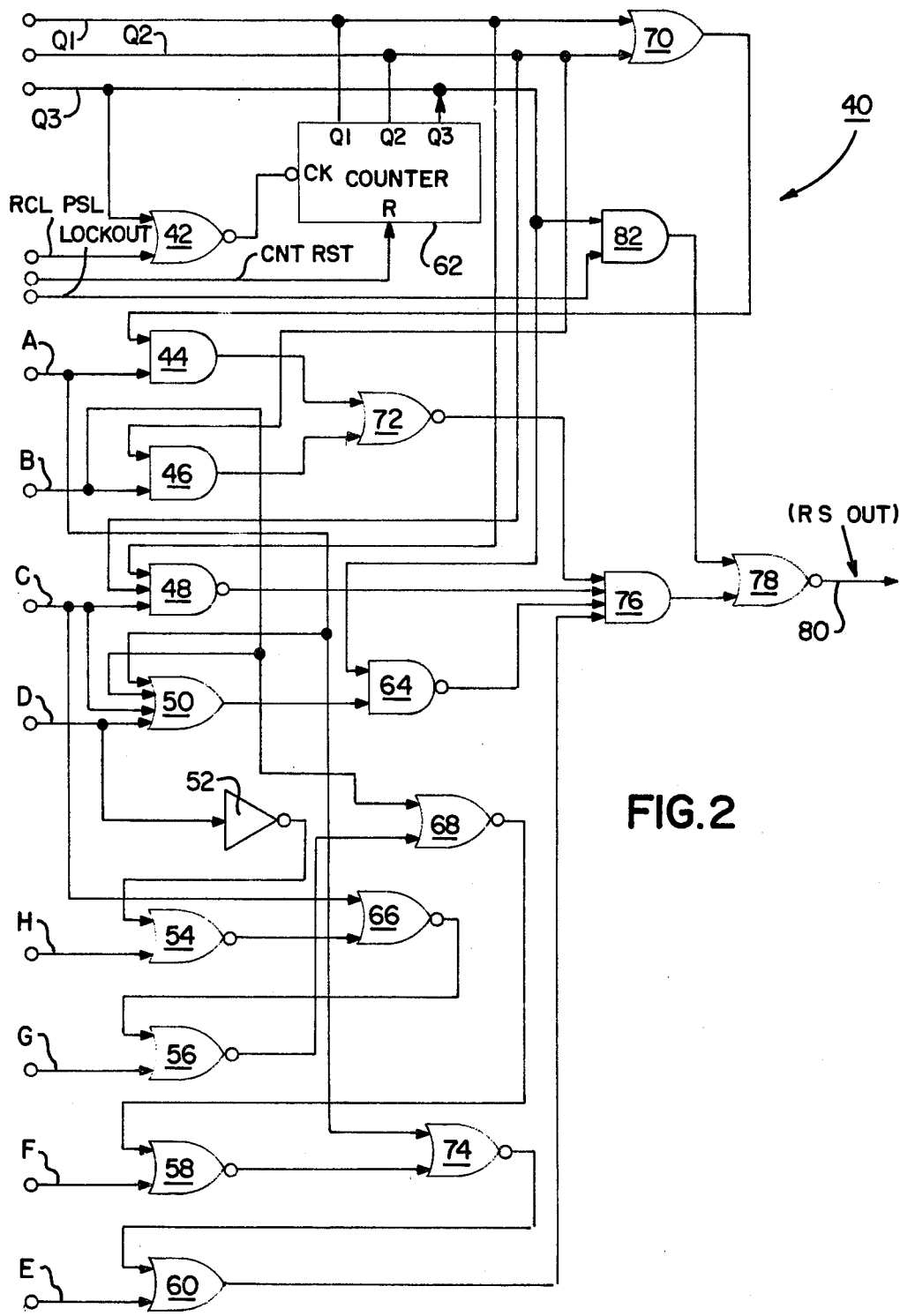
FIG. 2 is a circuit diagram showing the preferred embodiment relay spare logic means of the present invention.

FIG. 1 primarly shows the various external control means which interface with the relay spare logic means 40 illustrated in FIG. 2 to develop a relay spare output signal in accordance with the present invention. As illustrated, the relay spare circuit 10 of the present invention generally comprises a first series of relay spare selection switches 12, 14, 16, and 18, a second series of reclose selection switches 20, 22, 24, and 26, a recloser control means 28 and relay spare logic means 40, and develops a relay spare output (RS OUT) at 80.

Relay spare selection switches 12, 14, 16, 18 are operator controlled switches which are used to select a desired relay spare. For example, relay spare selection switch 12 (Selection 1) is used to cause the relay spare circuit to operate in conjunction with the first relay reclose signal; relay spare selection switch 14 (Selection 2) is used to cause the relay spare circuit to operate in conjunction with the second relay reclose signal; relay spare selection switch 16 (Selection 3) is used to cause the relay spare circuit to operate in conjunction with the third relay reclose signal; and relay spare selection switch 18 (Selection 4) is used to cause the relay spare circuit to operate in conjunction with the fourth relay reclose signal.

Relay reclose selection switches 20, 22, 24, 26 are also operator controlled switches which are used to select the reclosures which are to comprise the desired reclose cycle for a particular application. For example, relay reclose selection switch 20 is used to select the first reclose function of the recloser relay, which is generally an "instantaneous" reclose which occurs with no intentional delay (other than inherent delays within the system) after receiving a signal that the circuit breaker has been tripped. Relay reclose selection switch 22 is used to select the second reclose function of the recloser relay, which would normally include a first, relatively short time delay after receiving a signal that the circuit breaker has been tripped. Relay reclose selection switch 24 is used to select the third reclose function of the recloser relay, which would normally include a second, intermediate time delay (generally longer than the first time delay) after receiving a signal that the circuit breaker has been tripped. Lastly, recloser relay selection switch 26 is used to select the fourth reclose function of the recloser relay, which would normally include a third, generally longest time delay after receiving a signal that the circuit breaker has been tripped. Generally, a recloser relay will produce up to four reclose signals. Since such recloser relays are used in many different applications, the operator must select the various reclosures which are to comprise the reclose cycle based upon the application involved.

In accordance with the present invention, relay spare Selection 1 is caused to operate in conjunction with the first reclose signal; relay spare Selection 2 is caused to operate in conjunction with the second reclose signal; relay spare Selection 3 is caused to operate in conjunction with the third reclose signal; and relay spare Selection 4 is caused to operate in conjunction with the fourth reclose signal. However, since the relay spare and reclose circuits operate at approximately the same time, and since the reclose output of the recloser relay and the circuit breaker are significantly slower than the relay spare output relay, each relay spare will occur slightly before its corresponding reclosure, thereby developing the desired relay spare function without the need for additional timing circuitry.

As shown in FIG. 1, each of the switches 12, 14, 16, 18, 20, 22, 25, 26 are commonly connected to the $V_{SS}(0)$ voltage bus and commonly connected to the $V_{DD}(1)$ voltage bus, respectively. Accordingly, each of the switches 12, 14, 16, 18, 20, 22, 24, 26 are used to develop the signals A, B, C, D, E, F, G, and H, respectively, depending upon the state of each switch, for a purpose which will be more fully described below.

FIG. 1 further shows the signals E, F, G, H as being routed to a recloser control means 28. One component which may be used to develop the function of the recloser control means 28 is the Modular Reclosing Relay Model No. DAR 100, manufactured by S. A. Construcciones Electricas De Proteccion, Av. Pinoa 10, Zamudio (Bilbao), P.O. Box 732, Bilbao, Spain. In order to adapt such a component to operate in conjunction with the circuit arrangement of the present invention, output signals Q1, Q2, Q3 which are to be more fully described in conjunction with the circuit arrangement illustrated in FIG. 2 are also routed to the recloser control means 28, as shown, to provide the recloser control means 28 with information indicating where the system stands in the reclose cycle. The recloser control means 28 also monitors the breaker auxiliary contact Y for an indication of the status of the circuit breaker, and the breaker control switch Z for an indication of a manual close signal to the circuit breaker. The signals E, F, G, H, Q1, Q2, Q3, Y, Z are used as inputs to the recloser control means 28 to produce the following three input signals:

(1) CNT RST—a counter reset signal which is produced when a reclose cycle is to commence;
(2) RCL PSL—a reclose pulse signal which is produced each time a reclose is attempted; and
(3) LOCKOUT—a lockout signal which is produced to indicate an unsuccessful reclose after completion of the selected reclose cycle.

For further details regarding the construction and operation of such recloser control means, reference is also made to U.S. Pat. Nos. 3,381,177; 3,333,154; and 2,582,027, previously referred to. It will be understood that the construction and operation of such recloser control means do not form part of the present invention, but that such devices may be used to develop a variety of signals pertaining to the reclose cycle. The signals CNT RST; RCL PSL; and LOCKOUT are then applied to the relay spare logic means 40, together with the signals A, B, C, D, E, F, G, H, as shown.

FIG. 2 shows the preferred embodiment relay spare logic means 40 of the present invention in greater detail. FIG. 2 shows the RCL PSL signal as being routed to NOR circuit 42. The output of NOR circuit 42 is routed to a Counter 62 via its Clock (CK) input. The CNT RST signal is also routed to the Reset (R) input of Counter 62.

Counter 62 is a three bit counter which develops three sequential outputs Q1, Q2, Q3 whose time relationship will be hereinafter described in further detail with reference to FIG. 3. The Q1 and Q2 outputs are each routed to a two input OR circuit 70. The output of OR circuit 70 is routed to one input of a two input AND circuit 44, having as the second input the signal A of FIG. 1. The Q3 output of Counter 62 is routed to the second input of NOR circuit 42, to a first input of a two input NAND circuit 64 and to a first input of a two input AND circuit 82. The Q1 output of Counter 62 is also routed to one input of a three input NAND circuit 48, while the Q2 output of Counter 62 is also routed to a second input of the NAND circuit 48 and to one input of a two input AND circuit 46.

The signal A of FIG. 1 is further routed to one input of a two input NOR circuit 74, and to one input of a four input OR circuit 50. The output of AND circuit 44, which relates to signal A, is routed to one input of a two input NOR circuit 72.

The signal B of FIG. 1 is routed to the second input of AND circuit 46, and is also routed to a second input of OR circuit 50. The signal B is further routed a first input of a two input NOR circuit 68. The output of AND circuit 46, which relates to signal B, is routed to the second input of NOR circuit 72, the output of which is in turn routed to the first input of a four input AND circuit 76.

The signal C of FIG. 1 is routed to one input of NAND circuit 48, to the third input of OR circuit 50, and to a first input of a two input NOR circuit 66. The output of NAND circuit 48, which relates to signal C, is routed to a second input of AND circuit 76.

The signal D of FIG. 1 is routed to the fourth input of OR circuit 50, and to an Inverter 52 whose output is routed to a first input of a two input NOR circuit 54. The output of four input OR circuit 50, which relates to signals A, B, C, and D, is routed to the second input of NAND circuit 64, whose output is in turn routed to a second input of AND circuit 76.

The signal H of FIG. 1 is routed to the second input of NOR circuit 54, whose output is in turn routed to the second input of NOR circuit 66. The output of NOR circuit 66 is in turn routed to the first input of a two input NOR circuit 56.

The signal G of FIG. 1 is routed to the second input of NOR circuit 56, whose output is in turn routed to the second input of NOR circuit 68. The output of NOR circuit 68 is in turn routed to the first input of a two input NOR circuit 58.

The signal F of FIG. 1 is routed to the second input of NOR circuit 58, whose output is in turn routed to a second input of NOR circuit 74. The output of NOR circuit 74 is in turn routed to the first input of a two input OR circuit 60.

The signal E of FIG. 1 is routed to the second input of OR circuit 60, whose output is routed to the fourth input of AND circuit 76.

The output of AND circuit 76 is routed to a first input of a two input NOR circuit 78. The LOCKOUT signal of FIG. 1 is routed to the second input of AND circuit 82, the output of AND circuit 82 in turn being routed to the second input of NOR circuit 78. The output of NOR circuit 78 is the signal 80 (relay spare) which is the output (RS OUT) of the relay spare circuit of the present invention.

The logic mechanization of the relay spare logic means 40 of FIG. 2, having the applied signals A, B, C, D, E, F, G, H, CNT RST, RCL PSL, and LOCKOUT, may be expressed by the following Boolean equation.

would be eliminated by connecting the respective reclose selection switch 20, 22, 24, 26 to $V_{SS}(0)$, accordingly varying the respective signals E, F, G, H. The selection of relay spares is similarly accomplished as will be more fully described below.

Figure 3:
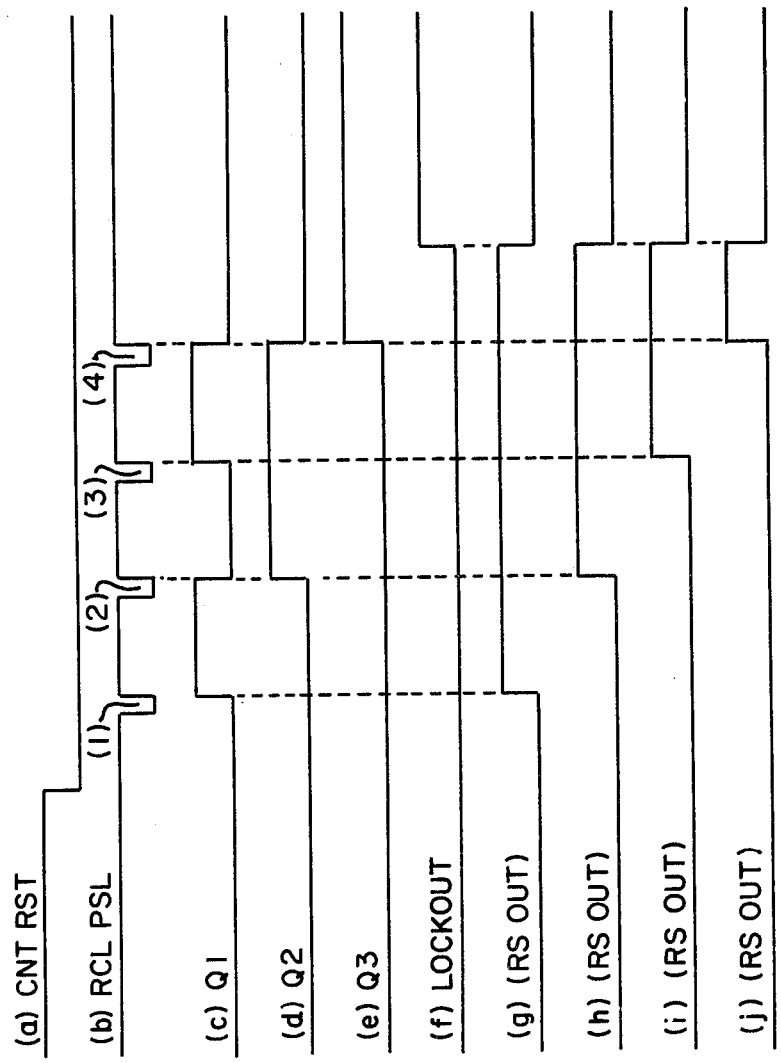
FIG. 3 is a timing diagram showing the interrelationship between the selected reclose cycle and the relay spare output signal desired.

FIG. 3 is segmented so that: FIG. 3a shows the CNT RST signal of FIGS. 1 and 2; FIG. 3b shows the RCL PSL signal of FIGS. 1 and 2; FIG. 3c shows the output Q1 of the Counter 62 of FIG. 2; FIG. 3d shows the output Q2 of the Counter 62 of FIG. 2; FIG. 3e shows the output Q3 of the Counter 62 of FIG. 2; and FIG. 3f shows the LOCKOUT signal of FIGS. 1 and 2.

FIG. 3g shows the (RS) output signal of the present invention with the first relay spare selection switch 12 at $V_{DD}(1)$ and the remaining relay spare selection switches 14, 16, 18 at $V_{SS}(0)$ (selecting a relay spare on the first reclose). FIG. 3h shows the (RS) output signal of the present invention with the second relay spare selection switch 14 at $V_{DD}(1)$ and the remaining relay spare selection switches 12, 16, 18 at $V_{SS}(0)$ (selecting a relay spare on the second reclose). FIG. 3i shows the (RS) output signal of the present invention with the third relay spare selection switch 16 at $V_{DD}(1)$ and the remaining relay spare selection switches 12, 14, 18 at $V_{SS}(0)$ (selecting a relay spare on the third reclose). Lastly, FIG. 3j shows the (RS) output signal of the present invention with the fourth relay spare selection switch 18 at $V_{DD}(1)$ and the remaining relay spare selection switches 12, 14, 16 at $V_{SS}(0)$ (selecting a relay spare on the fourth reclose).

FIG. 3a shows the occurrence of the CNT RST signal which is produced by the recloser control means 28 to indicate the initiation of a reclose cycle. The CNT RST signal, by resetting the content of Counter 62, produces a $V_{SS}(0)$ output for either the (1) (RS OUT) of FIG. 3g; (2) (RS OUT) of FIG. 3h; (3) (RS OUT) of FIG. 3i; or (4) (RS OUT) of FIG. 3j, all of which are to be described below.

FIG. 3b shows the RCL PSL signal which is generated by the recloser control means 28 to indicate the occurrence of each of the four reclosures which comprise the present selected reclose cycle. The signal of FIG. 3b is the pulse or sequence control whose occurrence changes or increments the condition of the outputs Q1, Q2, Q3 of Counter 62 as indicated in FIGS. 3c, 3d, and 3e. The RCO PSL signal of FIG. 3b is shown to have four sequential occurrences depicted as (1), (2), (3) and (4), one for each reclosure.

The first occurrence (1) of the RCL PSL signal of FIG. 3b causes Counter 62 to generate the Q1 output which is shown in FIG. 3c. The Q1 output of FIG. 3c, via the logic means 40 of FIG. 2, causes the generation $$RS = \overline{\left(E + \overline{A + \overline{F + \overline{B + \overline{G + \overline{C + \overline{H + \overline{D}}}}}}}\right) \overline{Q3(A + B + C + D)} \ \overline{A(Q1 + Q2) + BQ2} \ \overline{CQ1Q2} + L}$$

The operation of the circuit arrangement of FIGS. 1 and 2 is best described with reference to FIG. 3. For convenience, the description of FIG. 3 is given in relation to a situation wherein all four reclosures of the recloser relay have been selected. Such a condition is selected by connecting each reclose selection switch 20, 22, 24, 26 to $V_{DD}(1)$ so that signals E, F, G, H, respectively, are generated and will be applied to the relay spare logic means 40 and to the recloser control means 28. Of course, in other applications, unwanted recloses of the (RS OUT) signal of the present invention shown in FIG. 3g, thereby selecting a relay spare on the first reclose.

The second occurrence (2) of the RCL PSL signal of FIG. 3b causes the Counter 62 to terminate the Q1 output of FIG. 3c and to generate the Q2 output which is shown in FIG. 3d. The Q2 output of FIG. 3d, via the logic means 40 of FIG. 2, causes the generation of the (RS OUT) signal of the present invention shown in FIG. 3h, thereby selecting a relay spare on the second reclose. Note that the (RS OUT) signal of the present invention shown in FIG. 3g will again cause the occurrence of a relay spare on the second reclose, even though the second relay spare selection switch 14 is at $V_{SS}(0)$.

The third occurrence (3) of the RCL PSL signal of FIG. 3b will again increment the Counter 62, causing the reoccurrence of the Q1 output as shown in FIG. 3c and allowing the Q2 output of FIG. 3d to remain present. The Q1 and Q2 outputs of FIGS. 3c and 3d, via the logic means 40 of FIG. 2, cause the generation of the (RS OUT) signal of the present invention shown in FIG. 3i, thereby selecting a relay spare on the third reclose. Note that the (RS OUT) signal of the present invention shown in FIGS. 3g and 3h will again cause the occurrence of a relay spare on the third reclose, even though the third relay spare selection switch 16 is at $V_{SS}(0)$.

The fourth occurrence (4) of the RCL PSL signal of FIG. 3b causes the Counter 62 to terminate the Q1 and Q2 outputs of FIGS. 3c and 3d and to generate the Q3 output which is shown in FIG. 3e. The Q3 output of FIG. 3e, via the logic means 40 of FIG. 2, causes the generation of the (RS OUT) signal of the present invention shown in FIG. 3j, thereby selecting a relay spare on the fouth reclose. Note that the (RS OUT) signal of the present invention shown in FIGS. 3g, 3h and 3i will again cause the occurrence of a relay spare on the fourth reclose, even though the fourth relay spare selection switch 18 is at $V_{SS}(0)$.

The final signal produced by the recloser control means 28 is the LOCKOUT signal shown in FIG. 3f, which is routed to the OR circuit 78 located at the output stage of the logic means 40 of FIG. 2. The generation of this LOCKOUT signal by the recloser control means 28 indicates that reclosure has not been successfully achieved through the reclose cycle, and prevents or inhibits the generation of the signal 80 (RS OUT) of FIG. 2. Accordingly, the occurrence of the LOCKOUT signal shown in FIG. 3f will inhibit generation of either: (1) the (RS OUT) of FIG. 3g; (2) the (RS OUT) of FIG. 3h; (3) the (RS OUT) of FIG. 3i; or (4) the (RS OUT) of FIG. 3j, when the Counter 62 has generated a Q3 output.

The foregoing operation may be shown in a condensed manner by the matrix of FIG. 4. FIG. 4 shows that the signal A (Relay Spare Selection 1) causes the generation of the relay spare output (RS OUT) whether or not the signals B, C and D are present, as previously described. This condition is shown in FIG. 4 by the use of the symbol X, representative of a "DON'T CARE" condition. It may therefore be seen that the selection of a relay spare on the first reclose will have priority over all three subsequent relay spare selections. Similarly, FIG. 4 shows that the second highest priority (over both subsequent relay spare selections) is accorded to signal B (Relay Spare Selection 2), that the third highest priority (over the last relay spare selection) is accorded to signal C (Relay Spare Selection 3), and that the fourth or lowest priority is accorded to signal D (Relay Spare Selection 4).

As previously mentioned, the foregoing discussion in relation to FIGS. 3 and 4 addresses the affirmative selection of all four reclosures. However, in many applications one or more available reclosures may remain unselected by connecting the associated reclose selection switch to $V_{SS}(0)$, in turn causing the recloser control means 28 to omit the unselected reclosures. In such cases, an operator would generally select relay spares which correspond to selected recloses. Only the earliest desired relay spare need be selected since the relay spare logic means 40 will cause the output signal (RS OUT) 80 to occur upon the earliest selected relay spare, and to stay on until the LOCKOUT signal is detected. Thus, a relay spare would automatically be provided for subsequent selected reclosures in accordance with the prioritized scheme previously described, by comparing the signals A, B, C and D to the signals E, F, G and H via the relay spare logic means 40. As previously discussed, this would follow irrespective of the positioning of the relay spare selection switches corresponding to any subsequent reclosures which are to be performed.

Should the operator select a relay spare which corresponds to an unselected reclose, and should the unselected reclose follow one or more selected recloses, the output signal (RS OUT) 80 produced by the relay spare logic means 40 will cause a relay spare to occur in conjunction with the nearest, earlier selected reclose. Should the operator select a relay spare which corresponds to an unselected reclose, and should the unselected reclose not be preceeded by any selected recloses, the output signal (RS OUT) 80 produced by the relay spare logic means 40 will be caused to remain on (at $V_{DD}(1)$) until LOCKOUT is encountered, irrespective of the positioning of the remaining relay spare selection switches. This latter situation is further illustrated with reference to FIG. 5. As illustrated, the conditions described are unaffected by the positioning of subsequent reclose selection switches and other relay spare selection switches, as indicated by the use of the symbol X, representative of a "DON'T CARE" condition.

The foregoing priorities are established by the logic elements 52, 54, 56, 58, 60, 66, 68, 74 and 78 of the relay spare logic means 40 of FIG. 2, and is determined by the desired occurrence or presence of the signals A, B, C and D relative to the signals E, F, G and H, the LOCKOUT signal, and the prescribed sequential generation of signals Q1, Q2, and Q3 of Counter 62.

Thus, the circuit arrangement of FIG. 2 compares the condition of the relay spare selection switches 12, 14, 16, 18 against the condition of the reclose selection switches 20, 22, 24, 26 and determines where in the sequence of outputs Q1, Q2 and Q3 the earliest selected relay spare is to occur (signal A, B, C, or D) relative to where in the sequence of outputs Q1, Q2, and Q3 selected recloses will occur (signal E, F, G, or H). This comparison is correctly and automatically accomplished in accordance with the foregoing discussion irrespective of errors that may have been made regarding the manual selection of subsequent relay spares.

The output signal (RS OUT) which is developed at 80 in accordance with the present invention is then applied to an RS output relay associated with the recloser relay. The relay spare circuit 10 of the present invention thereby operates the RS output relay, subject to the positioning of reclose selection switches 20, 22, 24, 26 and relay spare selection switches 12, 14, 16, 18 and in accordance with the present invention, to provide the desired function of the relay spare. For example, the normally closed contact of the RS output relay could be used to disable the load-ratio control at a selected point in the reclose cycle by proper selection of the relay spare. Such a disabled condition would continue until LOCKOUT is reached. Alternatively, recloser relays generally include an output to block the instantaneous tripping function associated with a circuit breaker prior to the first reclose. The RS output relay can also be used to block this automatic tripping function prior to subsequent recloses if desired. Other applications are clearly possible, such as use of the relay spare output (RS OUT) to activate a spare alarm.

It should now be appreciated that my relay spare circuit for a recloser relay provides the art with a relay spare circuit which does not exhibit the limitations of prior devices such as the limited ability to freely adjust the reclose points of the reclose cycle, to adjust the portion of the reclose cycle at which the relay spare is to operate, and to permit such adjustments to be made without the need for additional timing circuits.

Further, it should be appreciated that my relay spare circuit provides a capability for having a relay spare output signal (RS OUT) which remains on until lockout is encounter when a previous or concurrent reclose has not been selected.

Still further, it should be appreciated that my relay spare circuit provides a recloser relay with means for properly responding to manual selections even though some of these manual selections may be in error.

It will therefore be understood that various changes in the details, materials and arrangement of parts which have been herein described and illustrated in order to explain the nature of this invention may be made by those skilled in the art within the principle and scope of the invention as expressed in the following claims.

What I claim is:

1. A relay spare circuit for a recloser relay, comprising:
   (a) a first plurality of switches for developing a first series of signals defining which of a plurality of available relay reclosures are to occur;
   (b) a second plurality of switches for developing a second series of signals defining which of the plurality of available relay reclosures are to be accompanied by the occurrence of a relay spare; and
   (c) logic means for receiving the first and second series of signals and for developing a relay spare output signal for causing the relay spare to occur in accordance with the relay reclosures and relay spares selected using the first and second switches, and the condition of the recloser relay throughout a reclose cycle comprised of the relay reclosures which are to occur, and during which reclosure of the recloser relay is attempted.

2. The relay spare circuit of claim 1 wherein there are four available reclosures, and wherein the first and second series of switches include four switches.

3. The relay spare circuit of claim 1 in which most of the components within the logic means are electronic components.

4. The relay spare circuit of claim 3 wherein the logic means automatically causes the relay spare output signal to occur in relation to selected relay reclosures.

5. The relay spare circuit of claim 3 wherein the time delay between the occurrence of a relay spare and the occurrence of a reclose is not responsive to a timing circuit.

6. The relay spare circuit of claim 3 wherein the time delay between the occurrence of a relay spare and the occurrence of a reclose is a fixed time delay determined as a function of the components which comprise the recloser relay and the circuit breaker.

7. The relay spare circuit of claim 3 wherein a relay spare corresponding to a selected reclose is selected, and wherein the logic means causes the relay spare output signal to be present in conjunction with the selected reclose.

8. The relay spare circuit of claim 7 wherein the relay spare output signal remains present during the remainder of the reclose cycle, whether or not subsequent relay spares have been selected.

9. The relay spare circuit of claim 8 wherein a lockout signal is provided which indicates unsuccessful reclosure at the end of the reclose cycle, and wherein the lockout signal inhibits the relay spare output signal.

10. The relay spare circuit of claim 3 wherein the earliest relay spare selected corresponds to a non-selected reclose, wherein at least one earlier reclose has been selected, and wherein the logic means causes the relay spare output signal to be present in conjunction with the closest preceeding selected reclose.

11. The relay spare circuit of claim 10 wherein the relay spare output signal remains present during the remainder of the reclose cycle, whether or not subsequent relay spares have been selected.

12. The relay spare circuit of claim 11 wherein a lockout signal is provided which indicates unsuccessful reclosure at the end of the reclose cycle, and wherein the lockout signal inhibits the relay spare output signal.

13. The relay spare circuit of claim 3 wherein the earliest relay spare selected corresponds to a non-selected reclose, wherein no earlier reclosures have been selected, and wherein the logic means causes the relay spare output signal to remain present during the entire reclose cycle.

14. The relay spare circuit of claim 13 wherein the relay spare output signal remains present regardless of subsequent reclosures which have been selected, or other relay spares which have been selected.

15. The relay spare circuit of claim 13 wherein a lockout signal is provided which indicates unsuccessful reclosure at the end of the reclose cycle, and wherein the lockout signal inhibits the relay spare output signal.

* * * * *